United States Patent
Wentink

(10) Patent No.: US 9,301,321 B2
(45) Date of Patent: Mar. 29, 2016

(54) FLEXIBLE TRANSMISSION AND BACK-OFF INTERVALS IN NETWORK DEVICES

(71) Applicant: QUALCOMM Incorporated, San Diego, CA (US)

(72) Inventor: Maarten Menzo Wentink, Breukelen (NL)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 14/201,372

(22) Filed: Mar. 7, 2014

(65) Prior Publication Data

US 2014/0254518 A1    Sep. 11, 2014

Related U.S. Application Data

(60) Provisional application No. 61/774,414, filed on Mar. 7, 2013.

(51) Int. Cl.
*H04W 74/08* (2009.01)

(52) U.S. Cl.
CPC ................................. *H04W 74/0816* (2013.01)

(58) Field of Classification Search
CPC ................................................ H04W 74/0816
See application file for complete search history.

(56) References Cited

U.S. PATENT DOCUMENTS

| | | | |
|---|---|---|---|
| 2004/0186907 A1 | 9/2004 | Wentink | |
| 2005/0135295 A1* | 6/2005 | Walton et al. | 370/328 |
| 2008/0107156 A1* | 5/2008 | Wentick et al. | 375/134 |
| 2010/0046454 A1 | 2/2010 | Wentink | |
| 2011/0249568 A1* | 10/2011 | Desai et al. | 370/242 |
| 2012/0071192 A1* | 3/2012 | Li et al. | 455/522 |
| 2012/0275334 A1* | 11/2012 | Hamada et al. | 370/252 |

(Continued)

FOREIGN PATENT DOCUMENTS

WO    2011053775    5/2011

OTHER PUBLICATIONS

"IEEE Std 802.11—2007; IEEE Standard for Information technology—Telecommunications and information exchange between systems—Local and metropolitan area networks; Part 11 : Wireless LAN Medium Access (MAC) and Physical Layer (PHY) Specifications", Jun. 12, 2007, pp. 23-468.

(Continued)

*Primary Examiner* — Brian D Nguyen
(74) *Attorney, Agent, or Firm* — DeLizio Law, PLLC

(57) ABSTRACT

A network device can be configured to dynamically vary a total back-off duration. The network device can determine a total transmit duration for transmitting data on a communication medium. If the total transmit duration exceeds a predetermined transmit interval associated with the data, the network device can determine the total back-off duration based, at least in part, on the total transmit duration and the predetermined transmit interval. The network device can initiate the total back-off duration by deferring data transmission on the communication medium during the total back-off duration. In some embodiments, if the network device implements multiple consecutive back-off intervals, the network device can determine whether to vary the duration of a second back-off interval depending on whether a transmission by another network device is detected on the communication medium after a first back-off interval elapses.

30 Claims, 9 Drawing Sheets

(56) References Cited

U.S. PATENT DOCUMENTS

2013/0100952 A1* 4/2013 Hart et al. .................... 370/390
2014/0064301 A1* 3/2014 Rison ........................... 370/448

OTHER PUBLICATIONS

"IEEE Std 802.11n—2009; IEEE Standard for Information technology—Telecommunications and information exchange between systems—Local and metropolitan area networks; Part 11 : Wireless LAN Medium Access Control (MAC) and Physical Layer (PHY) Specifications", Oct. 29, 2009, pp. 12-241.

"PCT Application No. PCT/US2014/022044 International Search Report", Sep. 17, 2014, 10 pages.

* cited by examiner

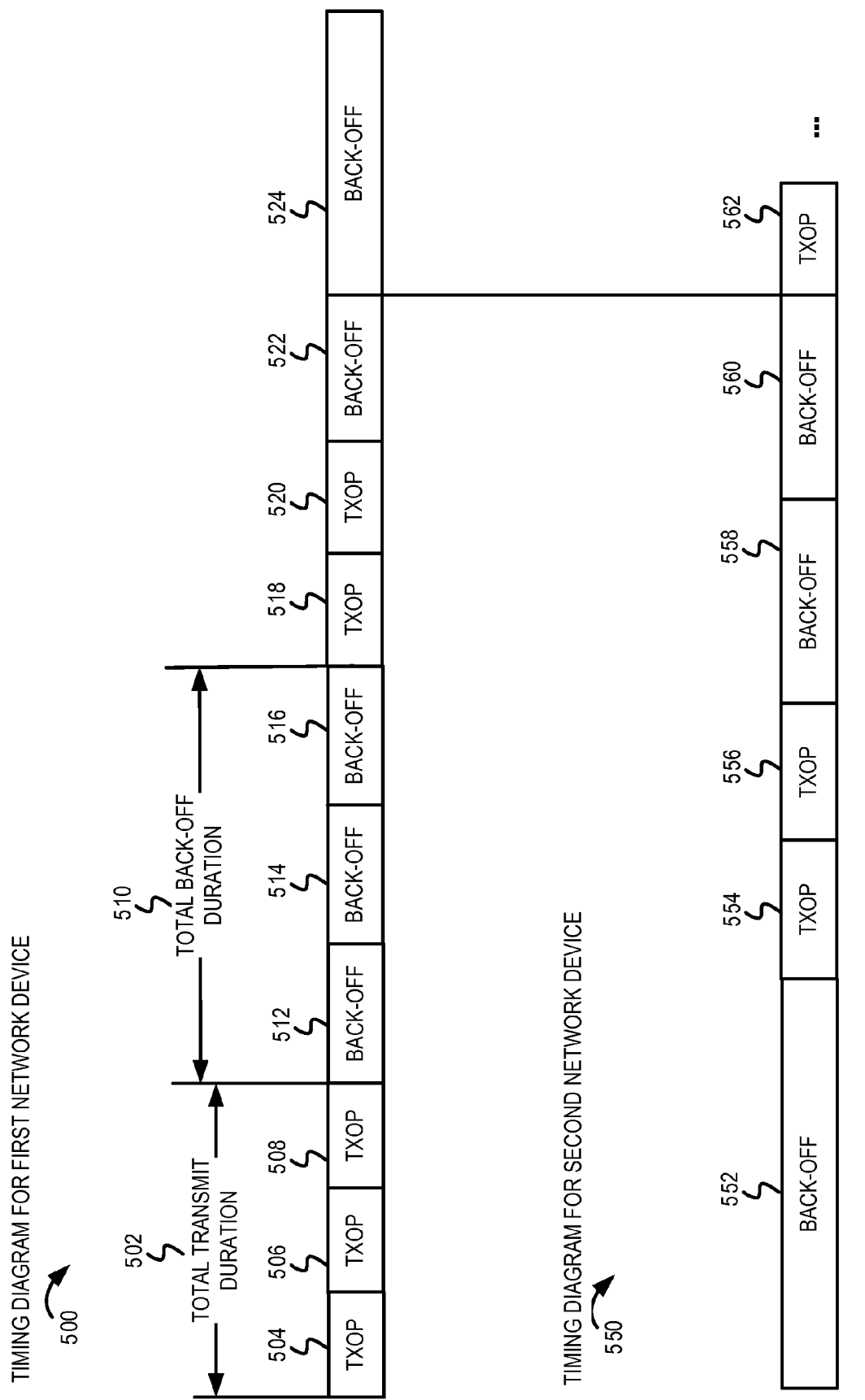

FLEXIBLE TRANSMISSION AND BACK-OFF INTERVALS IN NETWORK DEVICES

RELATED APPLICATION

This application claims the priority benefit of U.S. Provisional Application Ser. No. 61/774,414 filed on Mar. 7, 2013.

BACKGROUND

Embodiments of the inventive subject matter generally relate to the field of communication networks and, more particularly, to implementing flexible transmission and back-off intervals in a network device.

Wireless local area network (WLAN) devices typically use medium contention protocols (e.g., carrier sense multiple access and collision avoidance (CSMA/CA) protocols) to regulate access to a shared WLAN communication medium. For example, the contention protocols can enable each WLAN device to determine whether to transmit on the WLAN communication medium and how to avoid collisions with other transmissions. In accordance with IEEE 802.11 communication protocols, a WLAN device attempting to transmit data can initiate a random back-off interval prior to transmitting the data. The WLAN device can defer transmitting the data until after the random back-off interval elapses.

SUMMARY

Various embodiments for implementing flexible transmission and back-off intervals in a network device are disclosed. In one embodiment, the network device determines a total back-off duration based, at least in part, on a total transmit duration for transmitting on a communication medium and a predetermined transmit interval. The network device initiates the total back-off duration to prevent transmission on the communication medium during the total back-off duration.

BRIEF DESCRIPTION OF THE DRAWINGS

The present embodiments may be better understood, and numerous objects, features, and advantages made apparent to those skilled in the art by referencing the accompanying drawings.

FIG. 5 depicts example timing diagrams of two network devices that dynamically vary the total back-off duration in the communication network.

DESCRIPTION OF EMBODIMENT(S)

Figure 1:
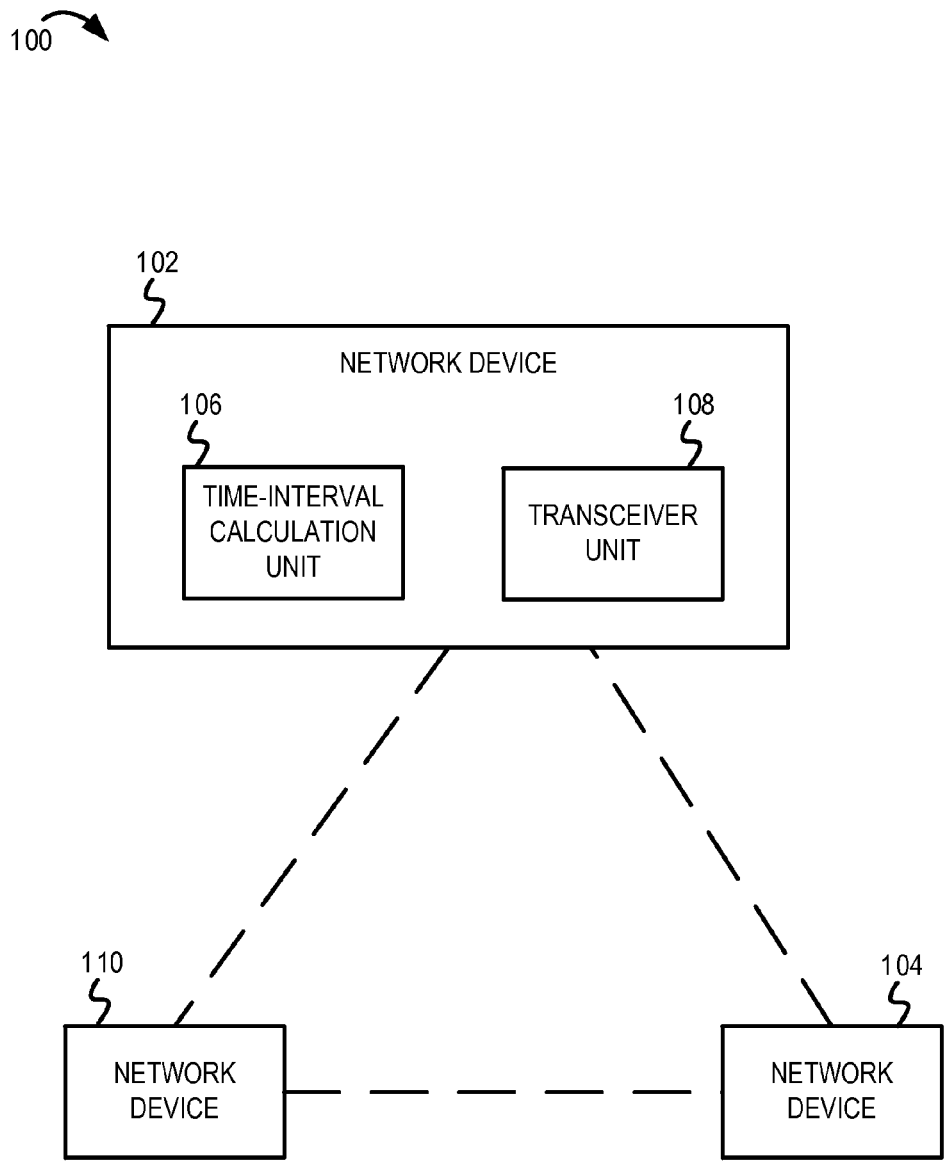
FIG. 1 is an example conceptual diagram illustrating a mechanism for implementing flexible transmission and back-off intervals.

The description that follows includes exemplary systems, methods, techniques, instruction sequences, and computer program products that embody techniques of the present inventive subject matter. However, it is understood that the described embodiments may be practiced without these specific details. For instance, although examples refer to operations for implementing flexible transmission and back-off intervals in a WLAN device, embodiments are not so limited. In other embodiments, the operations for flexible transmission and back-off intervals can be executed by network devices that implement other suitable communication protocols and standards (e.g., WiMAX, powerline communication (PLC), Ethernet, etc.). In other instances, well-known instruction instances, protocols, structures, and techniques have not been shown in detail in order not to obfuscate the description.

In accordance with IEEE 802.11 communication protocols, a network device is typically assigned a predetermined transmit interval, also referred to as a transmit opportunity (TXOP) limit. The predetermined transmit interval is a time duration during which the network device can continuously access the communication medium without initiating a back-off interval. Depending on the type and priority of data being transmitted, the network device may transmit communications for the transmit interval (i.e., the TXOP limit). After the transmit interval elapses, the network device relinquishes control of the communication medium and defers transmission for a predetermined back-off interval to allow other contending network devices to gain control of the communication medium. An example transmission/back-off sequence can be represented by: back-off transmit, back-off transmit, etc., where each transmit time period is less than or equal to the predetermined transmit interval. Thus, a transmitting network device may transmit communications only during the transmit interval and may temporarily relinquish control of the communication medium to other contending network devices. This can cause data scheduled for transmission to become less useful or stale. Particularly in the case of time-sensitive data (e.g., sounding data, beamforming parameters, etc.), initiating the back-off interval and relinquishing control of the communication medium after one transmit interval can reduce the usefulness of the time-sensitive data. This can also reduce the efficiency of communication systems (e.g., a multi-user multiple-input multiple-output (MU-MIMO) systems, beamforming systems, etc.).

In some embodiments, a network device can be configured to gain control of the communication medium for multiple consecutive transmit intervals (e.g., multiple consecutive TXOP limits). For example, the network device can determine the number of transmit intervals for which it will have control of the communication medium depending on the amount of data available for transmission and/or the duration of the transmit interval. After maintaining control of the communication medium (e.g., transmitting data) for a total transmit duration that is greater than the transmit interval, the network device can initiate multiple consecutive back-off intervals. For example, if the network device transmits data on the communication medium for two consecutive transmit intervals, the network device can initiate two consecutive back-off intervals, as illustrated by the following transmission/back-off sequence: transmit, transmit, back-off back-off transmit, transmit, back-off back-off etc. Furthermore, in some embodiments, when the network device implements multiple consecutive back-off intervals, the network device can determine whether to vary the duration of a subsequent back-off interval depending on whether a transmission by another network device is detected on the communication medium. For example, the network device may determine to implement consecutive back-off intervals. In this example, the network device may determine whether to vary the duration of a subsequent back-off interval depending on whether transmissions of other devices are detected after a current back-off interval elapses.

Clustering/grouping multiple transmit intervals can enable the network device to maintain control of the communication medium for a longer duration. This can help ensure that the network device relinquishes control of the communication medium after it transmits the time-sensitive data that is scheduled to be transmitted. Grouping multiple transmit intervals can also be useful for network devices and systems that rely on the "freshness" of the transmitted data. Also, implementing multiple back-off intervals when the network device gains control of the communication medium for multiple consecutive transmit intervals can help ensure fairness among network devices on the communication medium.

FIG. 1 is an example conceptual diagram illustrating a mechanism for implementing flexible transmission and back-off intervals. FIG. 1 depicts a communication network 100 including network devices 102, 104, and 110. The network device 102 includes a time-interval calculation unit 106 and a transceiver unit 108. Although not depicted in FIG. 1, the network devices 104 and 110 can also include a time-interval calculation unit and a transceiver unit similar to the network device 102. In some embodiments, the network devices 102, 104, and 110 can each be electronic devices, such as a laptop computer, a tablet computer, a mobile phone, a smart appliance, a gaming console, an access point, a desktop computer, a wearable device, or other suitable electronic devices. The network devices 102, 104, and 110 can each be configured to implement one or more communication protocols (e.g., the communication network 100 can be a WLAN and the network devices 102, 104, and 110 can each be WLAN devices). In some embodiments, in addition to WLAN communication protocols, the network devices 102, 104, and 110 may each implement other protocols and related functionality to enable other types of communications (e.g., BLUETOOTH® (Bluetooth), Ethernet, WiMAX, PLC, etc.). Furthermore, in some embodiments, the network devices 102, 104, and 110 may each include one or more radio transceivers, processors, analog front-end (AFE) units, memory, other components, and/or other logic to implement the communication protocols and related functionality.

In one embodiment, the network device 102 may determine to transmit data to another network device (e.g., the network device 110) in the communication network 100. The network device 102 can contend with the other network devices 104 and 110 for control and the opportunity to transmit on the communication medium. The network device 102 can randomly select a back-off interval based, at least in part, on a predetermined back-off contention window. The back-off contention window can be a preferred number of communication time slots for which the network device 102 should defer transmission before attempting to gain control of the communication medium. A communication time slot may refer to the smallest unit of time for which the network devices 102, 104, and 110 may transmit data or defer transmission on the communication medium. Accordingly, in one embodiment, the back-off contention window may be a maximum number of communication time slots for which the network device 102 may not contend for control of the communication medium. For example, the back-off contention window may include 15 communication time slots, 31 communication time slots, or another suitable number of time slots. The back-off interval can be selected by selecting a random number between a suitable lower limit (e.g., zero) and the back-off contention window. For example, if the back-off contention window includes 31 communication time slots, the back-off interval can be determined by selecting a random number between 0 and 31. In one example, if the back-off time interval is defined as 10 communication time slots, the network device 102 may not transmit data or attempt to gain control of the communication medium for 10 communication time slots. After the back-off interval elapses, the network device 102 can determine whether the communication medium is busy (e.g., whether the communication medium is in use by network device 110 or network device 104). If the communication medium is busy, the network device 102 can select and initiate another back-off interval. For example, the network device 102 can initiate another back-off interval that is twice the previous back-off interval. If the communication medium is not busy, the network device 102 can gain control of the communication medium and transmit data.

After the network device 102 gains control of the communication medium, the transceiver unit 108 can start transmitting buffered data to the network device 110. The time-interval calculation unit 106 can keep track of the duration for which the network device 102 transmits data on the communication medium. The duration for which the network device 102 consecutively transmits data on the communication medium is referred to as "total transmit duration." The time-interval calculation unit 106 can also determine a predetermined transmit interval or transmit opportunity (TXOP) limit based, at least in part, on the priority and type of data that was transmitted during the total transmit duration. In some embodiments, channel access in a WLAN can be governed by an enhanced distributed channel access (EDCA) protocol. The EDCA protocol can define multiple channel access priorities and data types, each of which is associated with a different predetermined transmit interval. In one example, there may be four access priorities and each of the access priorities may be associated with a different predetermined transmit interval. For example, a first access priority may be associated with a 2 ms transmit interval, a second access priority may be associated with a 4 ms transmit interval, and so on. The time-interval calculation unit 106 can determine a number of consecutive transmit intervals for which the network device 102 transmitted data on the communication medium. For example, if the transmit interval is 2 ms and the total transmit duration is 6 ms, the time-interval calculation unit 106 can determine that the network device 102 had control of the communication medium for three consecutive transmit intervals. After having control of the communication medium for multiple transmit intervals (e.g., the 6 ms total transmit duration), the network device 102 can defer transmission for multiple consecutive back-off intervals. The total amount of time for which the network device 102 defers transmission is referred to as "total back-off duration." During the total back-off duration, the network device 102 may not contend for control of the communication medium and may not transmit data on the communication medium. After the total back-off duration elapses, the network device 102 may attempt to gain control of the communication medium.

The time-interval calculation unit 106 can employ various techniques to calculate the total back-off duration. In one embodiment, the time-interval calculation unit 106 can determine a back-off interval based, at least in part, on the back-off contention window. For example, the time-interval calculation unit 106 can randomly select a back-off interval based, at least in part, on the back-off contention window. In one embodiment, the back-off contention window may be a maximum time interval (e.g., a maximum number of communication time slots) during which the network device 102 may not contend for control of the communication medium. The time-interval calculation unit 106 can determine the total back-off duration as a multiple of the back-off interval. In one embodiment, the number of back-off intervals that should be grouped together to form the total back-off duration can be determined by dividing the total transmit duration by the predetermined transmit interval (i.e., the TXOP limit), as depicted by Eq. 1. In Eq. 1, the "round-up" function can be used to round up the result to the next integer.

$$\text{No. of backoff intervals} = \text{round-up}\left(\frac{\text{total transmit duration}}{\text{predetermined transmit interval}}\right) \quad \text{Eq. 1}$$

Referring to Eq. 1, if the result of dividing the total transmit duration by the predetermined transmit interval is 2.2, the time-interval calculation unit 106 can round-up the result to yield three back-off intervals. In another embodiment, the number of back-off intervals may be determined by dividing the total transmit duration by the predetermined transmit interval and rounding the result to the nearest whole number. For example, if the result of dividing the total transmit duration by the predetermined transmit interval is 2.2, the time-interval calculation unit 106 can round the result to yield two back-off intervals. In another embodiment, the time-interval calculation unit 106 may not round the result of dividing the total transmit duration by the predetermined transmit interval. In this embodiment, the time-interval calculation unit 106 may use a fractional (i.e., non-whole number) result to determine the total back-off duration.

In one embodiment, the time-interval calculation unit 106 can determine the total back-off duration by multiplying the number of back-off intervals with the selected back-off interval, as depicted in Eq. 2.

$$\text{Total backoff duration} = \text{No. of backoff intervals} * \text{backoff interval} \quad \text{Eq. 2}$$

In another embodiment, the time-interval calculation unit 106 can calculate the total back-off duration as depicted by Eq. 3. As depicted by Eq. 3, the total back-off duration can be calculated without rounding off the result of dividing the total transmit duration by the predetermined transmit interval (i.e., the number of predetermined transmit intervals). In other words, the total back-off duration can be calculated by multiplying the back-off interval by the number of predetermined transmit intervals that were used in the preceding total transmit duration.

$$\text{Total backoff duration} = \left(\frac{\text{total transmit duration}}{\text{predetermined transmit interval}}\right) * \text{backoff interval} \quad \text{Eq. 3}$$

In another embodiment, the time-interval calculation unit 106 can multiply the back-off contention window by the number of predetermined transmit intervals that were used in the preceding total transmit duration to yield an effective back-off contention window. As discussed above, the back-off contention window can indicate a preferred number of communication time slots for which the network device should defer transmission on the communication medium. For example, the back-off contention window can indicate a maximum number of communication time slots for which the network device 102 should defer transmission and not contend for control of the communication medium. The time-interval calculation unit 106 can calculate an effective back-off contention window, as depicted by Eq. 4. The effective back-off contention window can be greater than, less than, or equal to the current back-off contention window depending on whether the total transmit duration is greater than, less than, or equal to the predetermined transmit interval, respectively. The time-interval calculation unit 106 can then select the total back-off duration by selecting a random value between zero and the effective back-off contention window.

$$\text{Effective contention window} = \left(\frac{\text{tot. transmit duration}}{\text{predetermined transmit interval}}\right) * \text{contention window} \quad \text{Eq. 4}$$

Figure 2A:
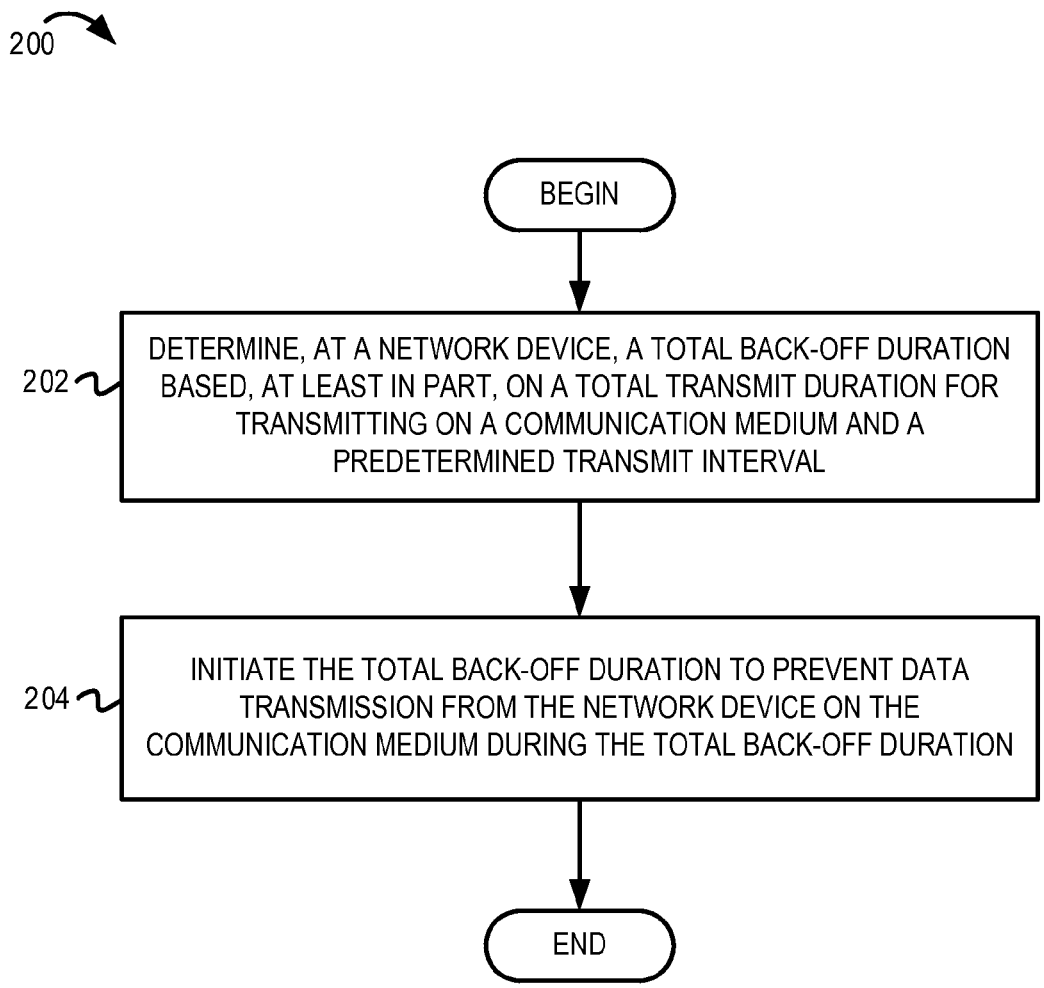
FIG. 2A is a flow diagram illustrating example operations of one embodiment for determining a back-off duration.

FIG. 2A is a flow diagram ("flow") 200 illustrating example operations of one embodiment for determining a back-off duration. The flow 200 begins at block 202

At block 202, a network device determines a total back-off duration based, at least in part, on a total transmit duration for transmitting on a communication medium and a predetermined transmit interval. The time-interval calculation unit 106 can keep track of the amount of time the network device 102 transmitted data on the communication medium. In some embodiments, the transmit duration for which the network device 102 had control of the communication medium may be determined based, at least in part, on the amount of data transmitted by the network device 102. Additionally, the time-interval calculation unit 106 may select an appropriate transmit interval depending on the priority of the data transmitted by the network device 102. In some embodiments, the time-interval calculation unit 106 may determine the total back-off duration if the total transmit duration exceeds the predetermined transmit interval. The network device 102 may transmit communications on the communication medium for multiple consecutive transmit intervals (e.g., to ensure that time-sensitive data does not become invalid). The network device 102 may determine the total back-off duration in order to implement multiple consecutive back-off intervals prior to starting the next transmit duration and transmitting the next set of data. The time-interval calculation unit 106 can use various techniques to determine the total back-off duration. For example, the time-interval calculation unit 106 can determine the total back-off duration using Eq. 1 and Eq. 2, Eq. 3, or Eq. 4 described above. The flow continues at block 204.

At block 204, the network device initiates the total back-off duration to prevent data transmission from the network device on the communication medium during the total back-off duration. In some embodiments, the time-interval calculation unit 106 can implement a back-off timer that keeps track of how long the network device 102 should defer transmitting data and contending for control of the communication medium. In some embodiments, the time-interval calculation unit 106 can determine whether the selected number of successive back-off intervals has elapsed. For example, if the time-interval calculation unit 106 determines that the network device 102 should implement five consecutive back-off intervals, the time-interval calculation unit 106 can determine whether five consecutive back-off intervals have elapsed. In other embodiments, the time-interval calculation unit 106 can access the back-off timer to determine whether the total back-off duration has elapsed. In another embodiment, the back-off timer or another background process may generate an interrupt (or other trigger signal) when the total back-off duration elapses. After the total back-off duration elapses, the network device may attempt to regain control of the communication medium. The network device may initiate data transmissions after gaining control of the communication medium. From block 204, the flow ends.

Figure 2B:
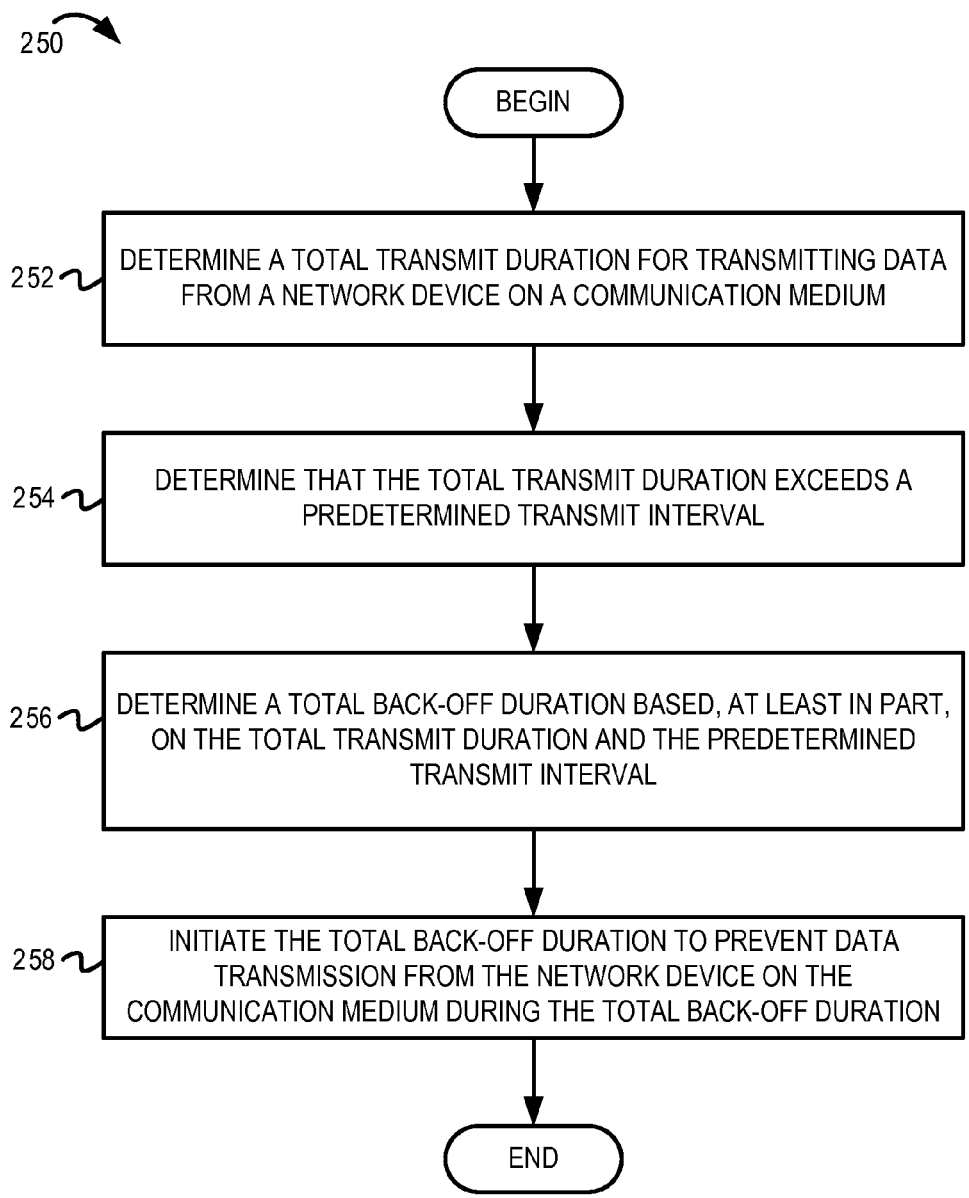
FIG. 2B is a flow diagram illustrating example operations of another embodiment for determining a back-off duration.

FIG. 2B is a flow diagram 250 illustrating example operations of another embodiment for determining a back-off duration. The flow 250 begins at block 252.

At block 252, a network device determines a total transmit duration for transmitting data on a communication medium. The network device 102 can contend with other network devices (e.g., the network devices 104 and 110) in the communication network 100 for control of a shared communication medium. After the network device 102 gains control of the communication medium, the transceiver unit 108 can transmit data to the network device 110. The time-interval calculation unit 106 can keep track of the amount of time for which the network device 102 transmitted data on the communication medium. In some embodiments, the transmit duration for which the network device 102 had control of the communication medium may be determined based, at least in part, on the amount of data transmitted by the network device 102. The flow continues at block 254.

At block 254, the network device determines that the total transmit duration exceeds a predetermined transmit interval. The transmit interval (i.e., the TXOP limit) can be a predetermined time interval during which the network device 102 can continuously transmit communications without back-off. The network device 102 may have a different transmit interval depending on the type and priority of data that was transmitted. For example, IEEE 802.11 communication protocols may indicate four access priorities (or priority levels). Accordingly, the network device 102 may have four transmit intervals—one for each of the access priorities. The time-interval calculation unit 106 may select an appropriate transmit interval depending on the priority of the communications transmitted by the network device. In one example, the time-interval calculation unit 106 may determine that "best effort" data (e.g., moderate priority data) was transmitted on the communication medium. In this example, the time-interval calculation unit 106 may select a transmit interval (e.g., a 2 ms transmit interval) that corresponds to the "best effort" data type. After transmitting data for multiple consecutive transmit intervals, the network device 102 may defer data transmission for multiple consecutive back-off intervals to maintain fairness with other network devices on the communication medium. The flow continues at block 256.

At block 256, the network device determines a total back-off duration based, at least in part, on the total transmit duration and the predetermined transmit interval. The network device 102 may transmit communications on the communication medium for multiple consecutive transmit intervals (e.g., to ensure that time-sensitive data does not become invalid). The network device 102 may determine the total back-off duration in order to implement multiple consecutive back-off intervals prior to starting the next transmit duration and transmitting the next set of data. The time-interval calculation unit 106 can use various techniques to determine the total back-off duration. For example, the time-interval calculation unit 106 can determine the total back-off duration using Eq. 1 and Eq. 2, Eq. 3, or Eq. 4 described above. The flow continues at block 258.

At block 258, the network device initiates the total back-off duration to prevent data transmission from the network device on the communication medium during the total back-off duration. In some embodiments, the time-interval calculation unit 106 can implement a back-off timer that keeps track of how long the network device 102 should defer transmitting data and contending for control of the communication medium. In some embodiments, the time-interval calculation unit 106 can determine whether the selected number of successive back-off intervals has elapsed. For example, if the time-interval calculation unit 106 determines that the network device 102 should implement five consecutive back-off intervals, the time-interval calculation unit 106 can determine whether five consecutive back-off intervals have elapsed. In other embodiments, the time-interval calculation unit 106 can access the back-off timer to determine whether the total back-off duration has elapsed. In another embodiment, the back-off timer or another background process may generate an interrupt (or other trigger signal) when the total back-off duration elapses. After the total back-off duration elapses, the network device may attempt to regain control of the communication medium. The network device may initiate data transmissions after gaining control of the communication medium. From block 258, the flow ends.

Figure 3A:
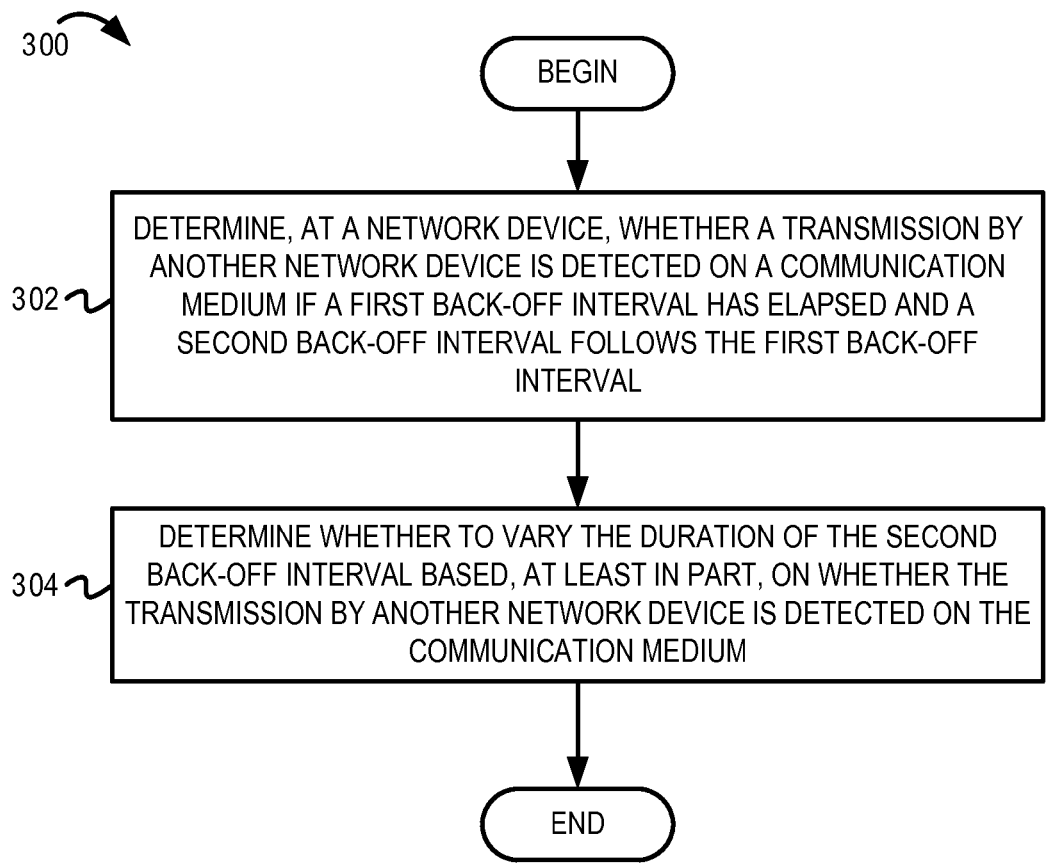
FIG. 3A is a flow diagram illustrating example operations of one embodiment for implementing flexible back-off intervals.

FIG. 3A is a flow diagram 300 illustrating example operations of one embodiment for implementing flexible back-off intervals. The flow 300 begins at block 302.

At block 302, a network device determines whether a transmission by another network device is detected on a communication medium if a first back-off interval has elapsed and a second back-off interval follows the first back-off interval. In some embodiments, the network device may determine a number of consecutive back-off intervals based, at least in part, a total transmit duration and a predetermined transmit interval during which the network device 102 can continuously transmit data on the communication medium. For example, the number of consecutive back-off intervals that comprise the total back-off duration may include a first back-off interval followed by a second back-off interval. In this example, after the first back-off interval elapses, the network device 102 can determine whether another network device initiated a transmission on the communication medium. this check can help the network device 102 determine whether to extend the duration of subsequent back-off intervals (e.g., the second back-off interval). The flow continues at block 304.

At block 304, the network device determines whether to vary the duration of the second back-off interval based, at least in part, on whether the transmission by another network device is detected on the communication medium. if a transmission by another device was detected after the first back-off interval elapsed, the network device may execute operations as if a collision has occurred. In one embodiment, if a transmission by another device was detected after the first back-off interval elapsed, the network device may increase the duration of the second back-off interval. From block 304, the flow ends.

Figure 3B:
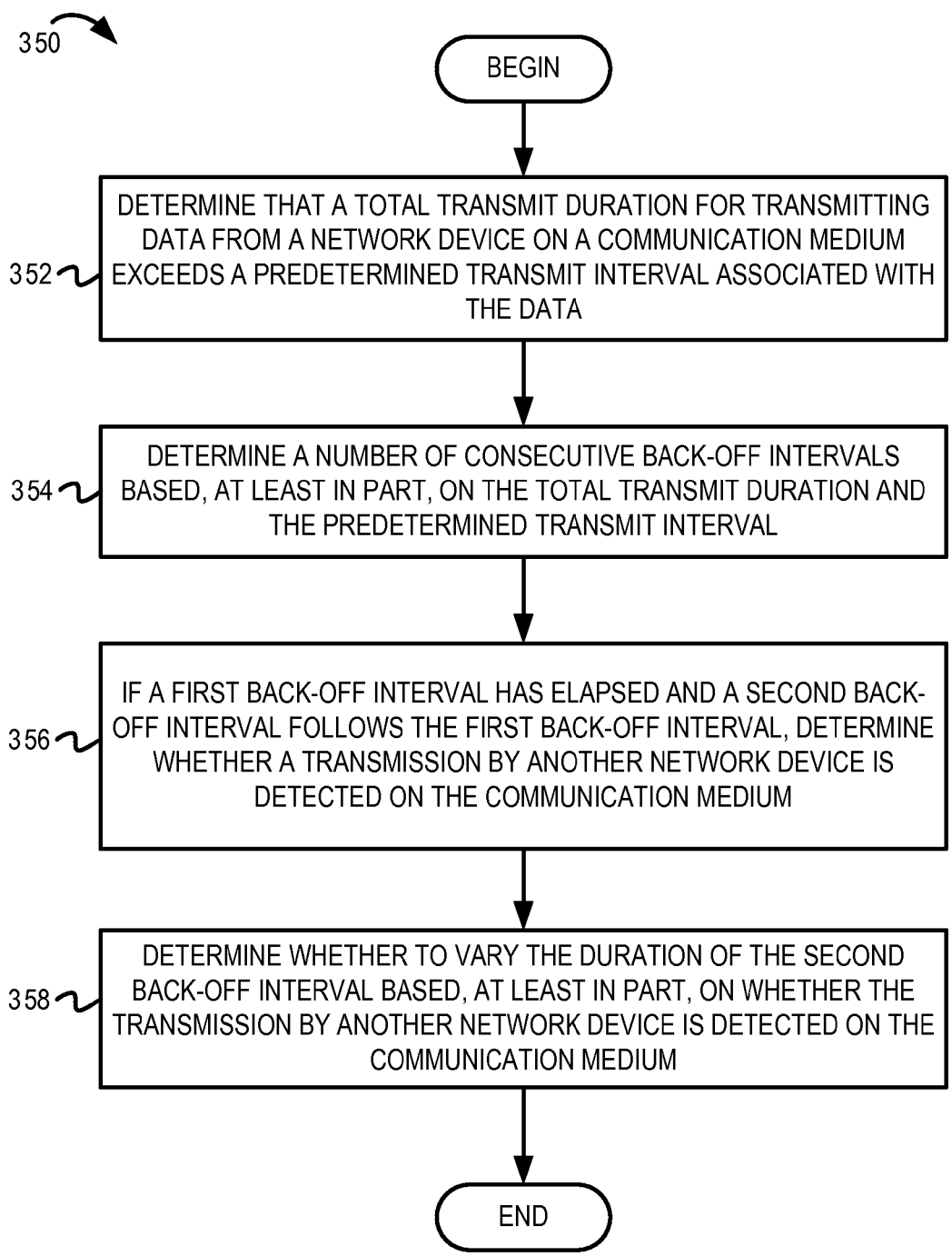
FIG. 3B is a flow diagram illustrating example operations of another embodiment for implementing flexible back-off intervals.

FIG. 3B is a flow diagram 350 illustrating example operations of another embodiment for implementing flexible back-off intervals. The flow 350 begins at block 352.

At block 352, a network device determines that a total transmit duration for transmitting data exceeds a predetermined transmit interval associated with the data. The time-interval calculation unit 106 can keep track of the amount of time for which the network device 102 transmitted communications on the communication medium. Also, the transmit interval can be a predetermined time interval during which the network device 102 can continuously transmit data on the communication medium. After transmitting data for multiple consecutive transmit intervals, the network device 102 may defer data transmission for multiple consecutive back-off intervals to maintain fairness with other network devices on the communication medium. The flow continues at block 354.

At block 354, the network device determines a number of consecutive back-off intervals based, at least in part, the total transmit duration and the predetermined transmit interval. In other words, the network device determines the total back-off duration to implement after the total transmit duration elapses. For example, the time-interval calculation unit 106 can use one of the techniques described above (e.g., Eq. 1) to determine the number of consecutive back-off intervals that should be implemented at the network device. The flow continues at block 356.

At block 356, if a first back-off interval has elapsed and a second back-off interval follows the first back-off interval, the network device determines whether a transmission by another network device is detected on the communication medium. For example, the number of consecutive back-off intervals that comprise the total back-off duration may include a first back-off interval followed by a second back-off interval. In this example, after the first back-off interval elapses, the network device 102 can determine whether another network device initiated a transmission on the communication medium. In some embodiments, this check can help the network device 102 determine whether to extend the duration of subsequent back-off intervals (e.g., the second back-off interval). The flow continues at block 358.

At block 358, the network device determines whether to vary the duration of the second back-off interval based, at least in part, on whether the transmission by another network device is detected on the communication medium. If a transmission by another device was detected after the first back-off interval elapsed, the network device may execute operations as if a collision has occurred. In one embodiment, if a transmission by another device was detected after the first back-off interval elapsed, the network device may increase the duration of the second back-off interval. From block 358, the flow ends.

Figure 4A:
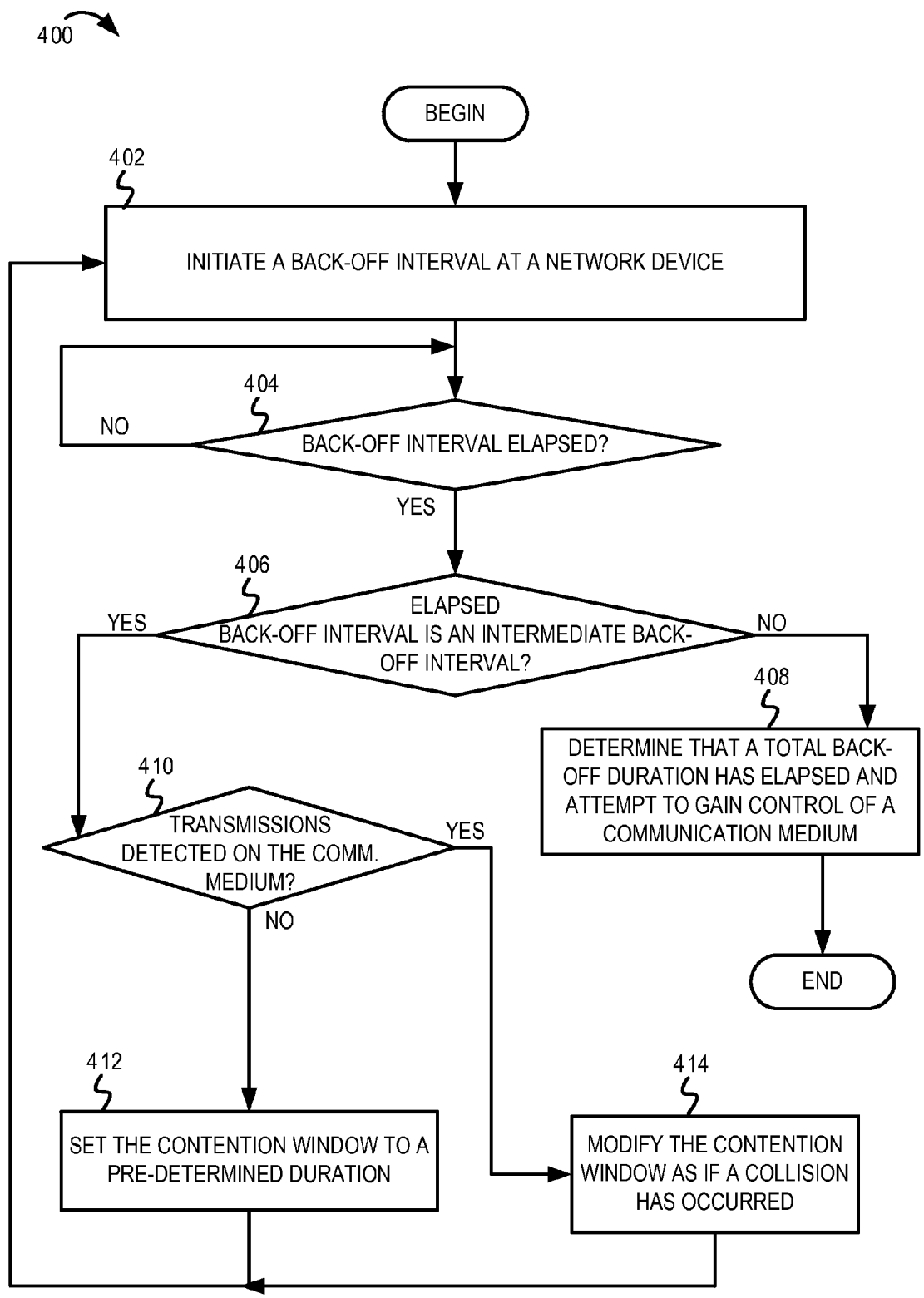
FIG. 4A is a flow diagram illustrating example operations of one embodiment for dynamically varying the total back-off duration.

FIG. 4A is a flow diagram 400 illustrating example operations of one embodiment for dynamically varying the total back-off duration. The flow 400 begins at block 402.

At block 402, a back-off interval is initiated at a network device. In some embodiments, the time-interval calculation unit 106 can implement a back-off timer that keeps track of each back-off interval. The time-interval calculation unit 106 can store a value of the back-off interval in the back-off timer. The time-interval calculation unit 106 can determine that one back-off interval has elapsed after the back-off timer counts down to zero. The flow continues at block 404.

At block 404, the network device determines whether the back-off interval has elapsed. In some embodiments, the time-interval calculation unit 106 can receive a notification (e.g., an interrupt or a trigger signal) from the back-off timer when the back-off interval elapses. In other embodiments, the time-interval calculation unit 106 can periodically access the back-off timer to determine whether the back-off interval has elapsed. If the back-off interval has not elapsed, the flow loops back to block 404, where the network device 102 waits until the back-off interval elapses. If the back-off interval has elapsed, the flow continues at block 406.

At block 406, it is determined whether the elapsed back-off interval is an intermediate back-off interval. A back-off interval that precedes another back-off interval may be referred to as an "intermediate back-off interval." For example, the time-interval calculation unit 106 may determine that the network device 102 should implement two consecutive back-off intervals—a first back-off interval and a second back-off interval. In this example, if the second back-off interval follows the first back-off interval, the first back-off interval may be referred to as an intermediate back-off interval. However, the second back-off interval may not be an intermediate back-off interval because there is no additional back-off interval that immediately follows the second back-off interval. In some embodiments, the time-interval calculation unit 106 may determine whether the total back-off duration has elapsed. As described above, the total duration of the selected number of back-off intervals may be referred to as the total back-off duration. Referring to the above example, the total back-off duration may include the first back-off interval followed by the second back-off interval. It is noted that in other embodiments, the total back-off duration may include any suitable number of back-off intervals (e.g., one back-off interval, three or more back-off intervals, etc.). If the total back-off duration has not elapsed, this indicates that the network device 102 will initiate at least one other back-off interval (e.g., the second back-off interval) before the next transmission interval. However, if the total back-off duration has elapsed, this indicates that the network device will not initiate additional back-off intervals before the next transmission interval. Thus, if the elapsed back-off interval is an intermediate back-off interval (i.e., the total back-off duration has not elapsed), the flow continues at block 410. Otherwise, if the elapsed back-off interval is not an intermediate back-off interval (e.g., the total back-off duration has elapsed), the flow continues at block 408.

At block 408, if the elapsed back-off interval is not an intermediate back-off interval, it is determined that the total back-off duration is elapsed and the network device attempts to gain control of a communication medium. As discussed above, the intermediate back-off interval refers to a back-off interval that is followed by one or more additional back-off intervals. Thus, if the elapsed back-off interval is not an intermediate back-off interval, the time-interval calculation unit 106 can determine that the final/last back-off interval and the total back-off duration have elapsed. In other words, the time-interval calculation unit 106 can determine that the selected number of consecutive back-off intervals have elapsed. Consequently, the time-interval calculation unit 106 may notify the network device 102 (e.g., the transceiver unit 108) to contend for control of the communication medium, if needed. After gaining control of the communication medium, the transceiver unit 108 can transmit data on the communication medium. From block 408, the flow ends.

At block 410, if the elapsed back-off interval is an intermediate back-off interval, the network device determines whether transmissions are detected on the communication medium. For example, the total back-off duration may include a first back-off interval followed by a second back-off interval. After the first back-off interval (i.e., the intermediate back-off interval) elapses, the transceiver unit 108 can sense the communication medium and determine whether another network device is transmitting data on the communication medium. Even though the network device 102 is not permitted to transmit on the communication medium and is configured to implement one or more additional back-off intervals, this check can help the network device 102 determine whether to extend the duration of the subsequent back-off intervals (e.g., the second back-off interval). In some embodiments, the transceiver unit 108 can monitor the communication medium for a predetermined sensing time interval to determine whether there are transmissions on the communication medium. In one embodiment, the sensing time interval can span an end portion of the intermediate back-off interval (e.g., the first back-off interval) and a beginning portion of the subsequent back-off interval (e.g., the second back-off interval). In another embodiment, the sensing time interval may only include an end portion of the first back-off interval. In another embodiment, the sensing time interval may only include a beginning portion of the second back-off interval.

In some embodiments, the time-interval calculation unit 106 may determine whether to vary the length of a back-off contention window based, at least in part, on whether the transmission is detected on the communication medium. The back-off contention window may represent a maximum number of communication time slots for which the network device defers data transmission on the communication medium. The time-interval calculation unit 106 may determine whether to vary the duration of the second back-off interval by determining whether to vary the length of the back-off contention window. It is noted that the duration of the second back-off interval may be determined from the back-off contention window. If transmissions are not detected on the communication medium, the flow continues at block 412. Otherwise, if transmissions are detected on the communication medium, the flow continues at block 414.

At block 412, if transmissions are not detected on the communication medium after the intermediate back-off interval elapses, the length of the contention window is set to a predetermined duration (e.g., a predetermined minimum duration or a predetermined duration as determined by the particular implementation or standard specifications). As a result, the next back-off interval duration may be amended to coincide with the changes to the contention window. For example, if the contention window is reset to a minimum contention window, the next back-off interval can be selected as a random number that falls between zero and the minimum contention window. In other embodiments, the duration of the next back-off interval may be the same as the duration of the current back-off interval. The flow then loops back to block 402, where the next back-off interval with the determined duration is initiated. It is noted that in some embodiments, the length of the contention window may be selected after initiating the next back-off interval (e.g., while the next back-off interval is in progress). The length of the back-off interval can be updated depending on the selected length of the contention window.

At block 414, if transmissions are detected on the communication medium after the intermediate back-off interval elapses, the contention window may be modified as if a collision has occurred. In some embodiments, the length of the contention window may be increased if transmissions are detected on the communication medium after the intermediate back-off interval elapses. As a result, the length of the next back-off interval may be increased. In some embodiments, if the network device 102 detects the start of a transmission from another network device 110 when the intermediate back-off interval elapses, the network device 102 may interpret this detected transmission as a collision with the network device 102. Therefore, if the transceiver unit 108 detects transmissions from another network device on the communication medium, the time-interval calculation unit 106 can increase the length of the next back-off interval. For example, if the total back-off duration includes a first back-off interval followed by a second back-off interval, transmissions may be detected after the first back-off interval elapsed. Consequently, the length of the second back-off interval may be increased. In some embodiments, the duration of the second back-off interval may be twice the duration of the first back-off interval. In other embodiment, the duration of the second back-off interval may exceed the duration of the first back-off interval by another suitable factor. In some embodiments, if the transceiver unit 108 detects transmissions from another network device on the communication medium, the time-interval calculation unit 106 can increase the length of the contention window for determining the second back-off interval. In some embodiments, the length of the contention window may be increased to twice the length of the current contention window (that was used for determining the duration of the first back-off interval). In other embodiment, the length of the contention window may exceed the length of the current contention window by another suitable factor. The duration of the second back-off interval may be selected based, at least in part, on the increased contention window. For example, the second back-off interval can be selected as a random number that falls between zero and the increased contention window. Proceeding from block 414 to block 402, the next back-off interval may be initiated. It is noted that in some embodiments, the length of the contention window may be selected after initiating the next back-off interval (e.g., while the next back-off interval is in progress). The length of the back-off interval can be updated depending on the increased length of the contention window.

Figure 4B:
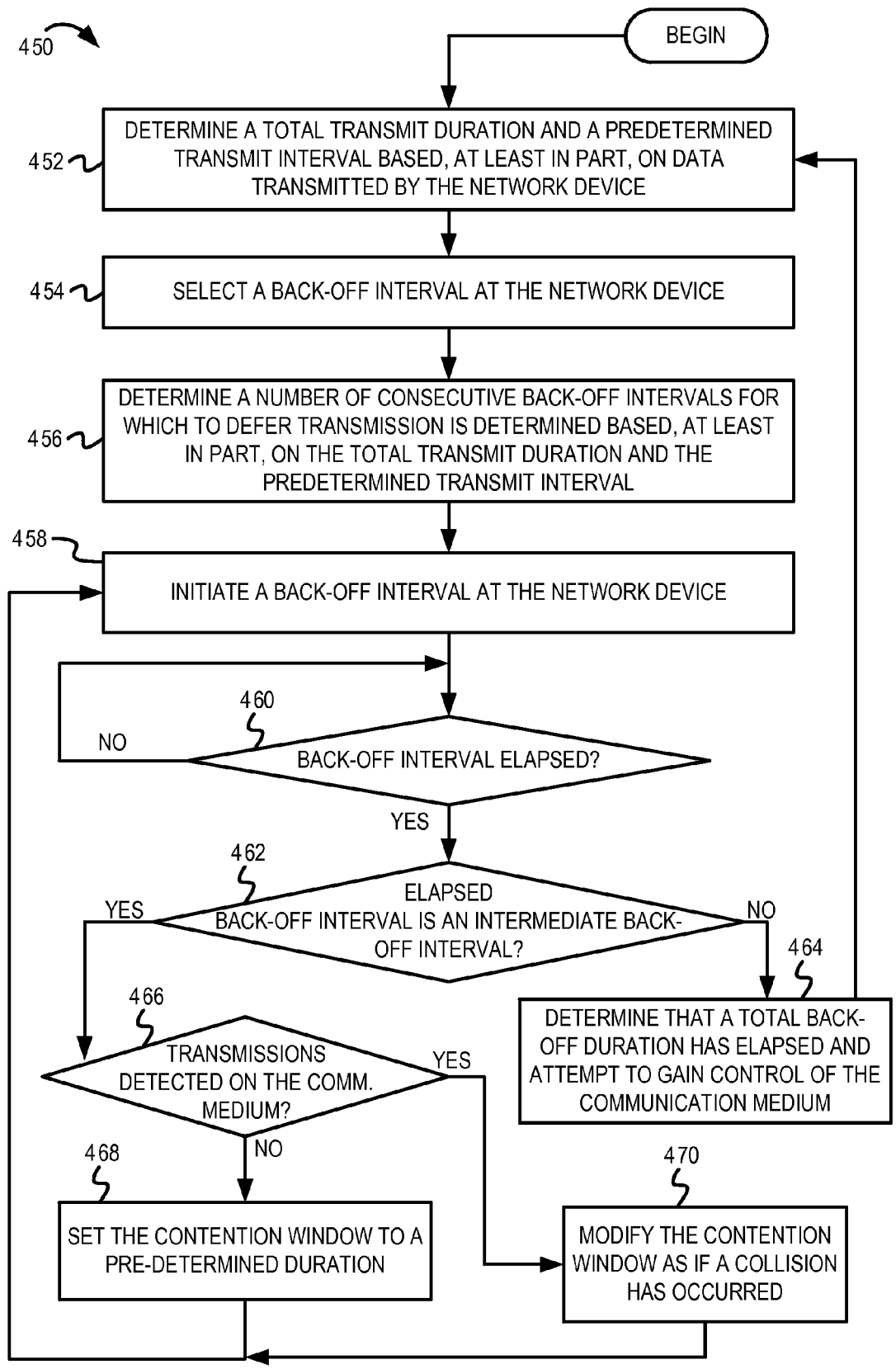
FIG. 4B is a flow diagram illustrating example operations of another embodiment for dynamically varying the total back-off duration.

FIG. 4B is a flow diagram 450 illustrating example operations of another embodiment for dynamically varying the total back-off duration. The flow 450 begins at block 452.

At block 452, a total transmit duration and a predetermined transmit interval are determined at a network device based, at least in part, on data transmitted by the network device. After the network device 102 gains control of the communication medium, the transceiver unit 108 can transmit data (e.g., data/management frames) to other network devices in the communication network 100. In some embodiments, the time-interval calculation unit 106 can determine the total transmit duration based on the amount of the data transmitted by the network device 102. For example, the time-interval calculation unit 106 can determine the total transmit duration based on the number of frames and the length of each frame transmitted by the network device 102. In another embodiment, the time-interval calculation unit 106 can implement a transmit timer to keep track of the duration for which the network device 102 had control of the communication medium. In addition, the time-interval calculation unit 106 can also determine the transmit interval (e.g., TXOP limit) based on the type and priority of the data that was transmitted during the total transmit duration. The flow continues at block 454.

At block 454, a back-off interval is selected at the network device. In one embodiment, the time-interval calculation unit 106 can select the back-off interval based, at least in part, on the back-off contention window and a local random (or pseudo-random) number generator. The random number generator can select a value that lies a lower limit (e.g., zero) and the back-off contention window. The selected value can be designated as the back-off interval. In another embodiment, the back-off interval may be predetermined based on the type and priority of the data that was transmitted during the total transmit duration. In some embodiments, the back-off interval may be of the same duration as the transmit interval. In another embodiment, the back-off interval may be another suitable predetermined value. The flow continues at block 456.

At block 456, a number of consecutive back-off intervals for which the network device should defer transmission is determined based, at least in part, on the total transmit duration and the predetermined transmit interval. After transmitting data for multiple consecutive transmit intervals, the network device 102 may not transmit data or contend for control of the communication medium during multiple consecutive back-off intervals. In one embodiment, as depicted in Eq. 1, the time-interval calculation unit 106 can divide the total transmit duration by the transmit interval. The time-interval calculation unit 106 can round the quotient to the next highest integer to determine the number of consecutive back-off intervals. For example, if the transmit duration is 3 ms and the TXOP limit is 2 ms, the time-interval calculation unit 106 can determine that the network device 102 should implement two consecutive back-off intervals. As discussed above, a communication time slot may refer to the smallest unit of time for which the network devices 102, 104, and 110 may transmit data or defer transmission on the communication medium. In the above example, if the back-off interval (selected at block 454) includes 7 communication time slots, the network device 102 may defer transmission for 14 communication time slots (i.e., two consecutive back-off intervals) before attempting to gain control of the communication medium. The total duration of the selected number of back-off intervals may be referred to as the total back-off duration. For example, the total back-off duration may include 2 back-off intervals if the time-interval calculation unit 106 determines to implement 2 consecutive back-off intervals at block 456. The flow continues at block 458.

At block 458, a back-off interval is initiated at the network device. In some embodiments, the time-interval calculation unit 106 can implement a back-off timer that keeps track of each back-off interval. The time-interval calculation unit 106 can store a value of the back-off interval in the back-off timer. The time-interval calculation unit 106 can determine that one back-off interval has elapsed after the back-off timer counts down to zero. The flow continues at block 460.

At block 460, the network device determines whether the back-off interval has elapsed. In some embodiments, the time-interval calculation unit 106 can receive a notification (e.g., an interrupt or a trigger signal) from the back-off timer when the back-off interval elapses. In other embodiments, the time-interval calculation unit 106 can periodically access the back-off timer to determine whether the back-off interval has elapsed. If the back-off interval has not elapsed, the flow loops back to block 460, where the network device 102 waits until the back-off interval elapses. If the back-off interval has elapsed, the flow continues at block 462.

At block 462, it is determined whether the elapsed back-off interval is an intermediate back-off interval. In some embodiments, the time-interval calculation unit 106 may determine whether the elapsed back-off interval is an intermediate back-off interval and whether the total back-off duration has elapsed as described above with reference to block 406 of FIG. 4A. If the elapsed back-off interval is an intermediate back-off interval (i.e., the total back-off duration has not elapsed), the flow continues at block 466. Otherwise, if the elapsed back-off interval is not an intermediate back-off interval (e.g., the total back-off duration has elapsed), the flow continues at block 464.

At block 464, if the elapsed back-off interval is not an intermediate back-off interval, it is determined that the total back-off duration is elapsed and the network device attempts to gain control of the communication medium. In some embodiments, if the elapsed back-off interval is not an intermediate back-off interval, the time-interval calculation unit 106 can determine that the final/last back-off interval and the total back-off duration have elapsed, as described above with reference to block 408 of FIG. 4A. Consequently, the time-interval calculation unit 106 may notify the network device 102 (e.g., the transceiver unit 108) to contend for control of the communication medium, if needed. After gaining control of the communication medium, the transceiver unit 108 can transmit data on the communication medium. From block 464, the flow loops back to block 452.

At block 466, if the elapsed back-off interval is an intermediate back-off interval, the network device determines whether transmissions are detected on the communication medium. In some embodiment, the transceiver unit 108 can monitor the communication medium for a predetermined sensing time interval to determine whether there are transmissions on the communication medium, as described above with reference to block 410 of FIG. 4A. If transmissions are not detected on the communication medium, the flow continues at block 468. Otherwise, if transmissions are detected on the communication medium, the flow continues at block 470.

At block 468, if transmissions are not detected on the communication medium after the intermediate back-off interval elapses, the length of the contention window is set to a predetermined duration (e.g., a predetermined minimum duration or a predetermined duration as determined by the particular implementation or standard specifications). In some embodiments, the time-interval calculation unit 106 may or may not modify the contention window if transmissions are not detected on the communication medium, as described above with reference to block 412 of FIG. 4A. The flow then loops back to block 458, where the next back-off interval with the appropriate duration is initiated. It is noted that in some embodiments, the length of the contention window may be selected after initiating the next back-off interval (e.g., while the next back-off interval is in progress). The length of the back-off interval can be updated depending on the selected length of the contention window.

At block 470, if transmissions are detected on the communication medium after the intermediate back-off interval elapses, the contention window may be modified as if a collision has occurred. In some embodiments, the time-interval calculation unit 106 may employ various techniques to modify the contention window if transmissions are detected on the communication medium, as described above with reference to block 414 of FIG. 4A. Proceeding from block 470 to block 458, the next back-off interval may be initiated. It is noted that in some embodiments, the length of the contention window may be selected after initiating the next back-off interval (e.g., while the next back-off interval is in progress). The length of the back-off interval can be updated depending on the increased length of the contention window. While not shown in FIG. 4B, the flow may end when no further back-off intervals are to be initiated.

FIG. 5 depicts example timing diagrams of two network devices that dynamically vary the total back-off duration in the communication network. The timing diagram 500 depicts transmission and back-off intervals of a first network device; while the timing diagram 550 depicts transmission and back-off intervals of a second network device. As depicted in the timing diagram 500, the first network device gains control of the communication medium and transmits data on the communication medium. As depicted in FIG. 5, the first network device transmits for a total transmit duration 502, which spans three consecutive transmit intervals 504, 506, and 508 (depicted as TXOP in FIG. 5). The first network device determines a total back-off duration 510 based, at least in part, on the total transmit duration 502 and the transmit interval, as described above using Eq. 1-Eq. 4. In FIG. 5, the first network device determines that the total back-off duration 510 should span three consecutive back-off intervals. The first network device can determine the duration of a back-off interval (e.g., based on the back-off contention window) and can defer transmission for three consecutive back-off intervals 512, 514, and 516. In the timing diagram 500, the back-off intervals 512 and 514 are each followed by additional back-off intervals. Therefore, the back-off intervals 512 and 514 are each referred to as an "intermediate back-off interval."

Referring to the timing diagram 550 for the second network device, the second network device may not initiate any transmissions and may not attempt to gain control of the communication medium while the first network device has control of the communication medium (e.g., during the total transmit duration 502). This is illustrated by the back-off interval 552 in the timing diagram 550. After the back-off interval 552 elapses, the second network device can attempt to gain control of the communication medium. In the timing diagram 550, the second network device gains control of the communication medium and transmits data for a transmit duration that spans two transmit intervals 554 and 556. As similarly discussed with reference to the first network device, after transmitting the available/buffered data, the second network device determines to implement two consecutive back-off intervals 558 and 560.

Referring to the timing diagram 500 for the first network device, after the total back-off duration 510 elapses, the first network device can contend with other network devices for control of the communication medium. In the timing diagram 500, the first network device gains control of the communication medium and transmits data for a duration that spans two transmit intervals 518 and 520. As discussed above, after transmitting the available/buffered data in the transmit intervals 518 and 520, the first network device determines to implement two consecutive back-off intervals 522 and 524. The first network device determines a random back-off interval and initiates the first back-off interval 522 with a duration indicated by the back-off interval. Because the back-off interval 522 is followed by another back-off interval 524, the back-off interval 522 is an intermediate back-off interval. After the intermediate back-off interval 522 elapses, the first network device determines whether there are transmissions from another network device on the communication medium. In other words, the first network device may determine that the back-off interval 522 has elapsed but the total back-off duration 510 has not elapsed. Accordingly, the first network device may determine whether to vary the duration of at least one subsequent back-off interval depending on whether there are transmissions from another network device on the communication medium. From the timing diagrams 500 and 550, the beginning of transmit interval 562 (and consequently, a transmission) of the second network device occurs at the end of the intermediate back-off interval 522 of the first network device. Therefore, the first network device operates as if a collision has occurred and determines to increase the duration of the second back-off interval 524. As depicted in the timing diagram 500, the duration of the second back-off interval 524 is greater than the duration of the first back-off interval 522. In some embodiments, the duration of the second back-off interval 524 can be twice the duration of the first back-off interval 522. In other embodiments, the duration of the second back-off interval 524 can be greater than the duration of the first back-off interval 522 by any suitable factor. In another embodiment, the first network device can increase the length of the back-off contention window and determine an effective back-off contention window, as described in Eq. 4. The first network device can select a random value that lies between a suitable lower limit (e.g., zero) and the effective back-off contention window. The first network device may initiate the second back-off interval 524 for a number of communication time slots that is equal to the random value that is selected depending on the effective back-off contention window.

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, although FIG. 2B describes the network device 102 determining the total transmit duration and the transmit interval after the communications are transmitted, embodiments are not so limited. In other embodiments, the network device 102 can determine the total transmit duration and the transmit interval before it starts transmitting data on the communication medium. For example, the time-interval calculation unit 106 can determine the total transmit duration for the network device 102 based, at least in part, on the amount of buffered data at the network device 102. The time-interval calculation unit 106 can also determine the transmit interval based, at least in part, on the type/priority of the buffered data.

Although FIG. 4B depicts the network device 102 calculating the number of back-off intervals after selecting the back-off interval (e.g., based on the back-off contention window), embodiments are not so limited. In other embodiments, the time-interval calculation unit 106 can calculate the number of back-off intervals before selecting the back-off interval. In some embodiments, the time-interval calculation unit 106 may select a predetermined back-off interval based, at least in part, on the type and priority of the data that was transmitted (or the buffered data).

In some embodiments, the time-interval calculation unit 106 can determine the number of additional/extra back-off intervals that the network device 102 should implement. The number of additional back-off intervals can be equal to the number of transmit interval boundaries that were crossed during the total transmit duration. Referring to the example timing diagram 500 of FIG. 5, the total transmit duration 502 spans three transmit intervals 504, 506, and 508. In FIG. 5, two transmit interval boundaries are crossed (i.e., at the interface between the transmit intervals 504 and 506 and between the transmit intervals 506 and 508) after the total transmit duration 502 begins. Accordingly, the first network device may implement two additional back-off intervals—for a total of three consecutive back-off intervals 512, 514, and 516, as depicted in FIG. 5.

In some embodiments, if the total transmit duration is less than the transmit interval, the network device 102 may defer transmission for a predetermined number of back-off intervals. In one embodiment, the network device 102 may defer transmission for at least one back-off interval if the total transmit duration is less than the transmit interval. In other embodiments, however, the network device 102 may defer transmission for any suitable number of consecutive back-off intervals (e.g., 2 consecutive back-off intervals) if the total transmit duration is less than the transmit interval. In another embodiment, the network device 102 may defer transmission for less than one back-off interval if the total transmit duration is less than the transmit interval.

In some embodiments, the time-interval calculation unit 106 can restrict the number of consecutive transmit intervals during which the network device 102 can transmit on the communication medium. Effectively, the time-interval calculation unit 106 can restrict the total transmit duration for which the network device 102 can transmit communications or restrict the amount of data that can be consecutively transmitted. For example, the time-interval calculation unit 106 may determine that the network device 102 may not transmit for more than a maximum transmit duration or may not transmit for more than a maximum number of consecutive transmit intervals. This can ensure that the network device 102 does not monopolize the communication medium after it gains control of the communication medium. If the time-interval calculation unit 106 determines that the amount of time required to transmit the buffered data exceeds the maximum transmit duration, the transceiver unit 108 may select a portion of the buffered data that should be transmitted. The portion of the buffered data may be selected based on the priority/type of the buffered data, whether the data is time-sensitive, the priority of the destination device, etc. For example, the transceiver unit 108 may determine to transmit the portion of data that is associated with the highest priority. After transmitting the portion of data during the maximum transmit duration, the network device 102 may initiate the total back-off duration (e.g., a suitable number of consecutive back-off intervals). After the total back-off duration elapses, the transceiver unit 108 can contend for control of the communication medium. The transceiver unit 108 can transmit some/all of the remaining buffered data after the network device 102 gains control of the communication medium. As another example, it may be determined that the transmission time associated with data scheduled to be transmitted from the network device 102 exceeds the maximum transmit duration associated with the network device 102. Accordingly, the network device 102 may transmit a first portion of the data for the maximum transmit duration. The network device may transmit a second portion of the data after the total back-off duration associated with transmitting the first portion of the data elapses. It is noted that the network device 102 may select the first portion and the second portion of data using any suitable techniques (e.g., priority of the data, latency specifications of the data, on a first-in first-out basis, etc.). Additionally, in some embodiments, the time-interval calculation unit 106 can restrict the total back-off duration for which the network device 102 defers transmitting on the communication medium and contending for control of the communication medium. In some embodiments, the time-interval calculation unit 106 can determine a maximum back-off duration or a maximum contention window. In some embodiments, the maximum back-off duration and the maximum contention window may be determined based, at least in part, on the maximum transmit duration.

In some embodiments, the time-interval calculation unit 106 may determine whether to cluster multiple consecutive transmit intervals depending on the availability of buffered data for transmission, the type and priority of data being transmitted, etc. For example, if the data scheduled to be transmitted is not time-sensitive data, the network device 102 may determine not to cluster multiple consecutive transmit intervals.

FIGS. 3-5 describe operations for extending the duration of the next back-off interval if a transmission is detected after an intermediate back-off interval elapses. However, various other embodiments are possible. In one embodiment, after the intermediate back-off interval elapses, the network device 102 may increase the duration of one subsequent back-off interval. For example, consider the timing diagram 500 where the network device 102 determines to implement three consecutive back-off intervals 512, 514, and 516. In this example, if a transmission is detected after the intermediate back-off interval 512 elapses, the network device 102 may only increase the duration of the next back-off interval 514 and may not increase the duration of the back-off interval 516. After the intermediate back-off interval 514 elapses, the network device 102 may sense the communication medium again and determine whether to increase the duration of the back-off interval 516. If a transmission is detected after the intermediate back-off interval 514 elapses, the network device 102 may increase the duration of the next back-off interval 516. However, if no transmissions are detected after the intermediate back-off interval 514 elapses, the network device 102 may not increase the duration of the next back-off interval 516. In other words, the duration of the back-off interval 516 may be the same as the duration of the initial back-off interval 512. In another embodiment, after the intermediate back-off interval elapses, the network device 102 may increase the duration of all the subsequent back-off intervals. For example, consider the timing diagram 500 where the network device 102 determines to implement three consecutive back-off intervals 512, 514, and 516. In this example, if a transmission is detected after the intermediate back-off interval 512 elapses, the network device 102 may increase the duration of the subsequent back-off intervals 514 and 516. Furthermore, after the intermediate back-off interval 514 elapses, the network device 102 may sense the communication medium again and determine whether to further increase the duration of the back-off interval 516. For example, the network device 102 may initially determine to implement three back-off intervals 512, 514, and 516, each having a duration of 2 ms. If a transmission is detected after the back-off interval 512 elapses, the network device 102 may increase the duration of each of the subsequent back-off intervals 514 and 516 to 4 ms. If a transmission is detected after the back-off interval 514 elapses, the network device 102 may further increase the duration of the back-off interval 516 to 8 ms.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
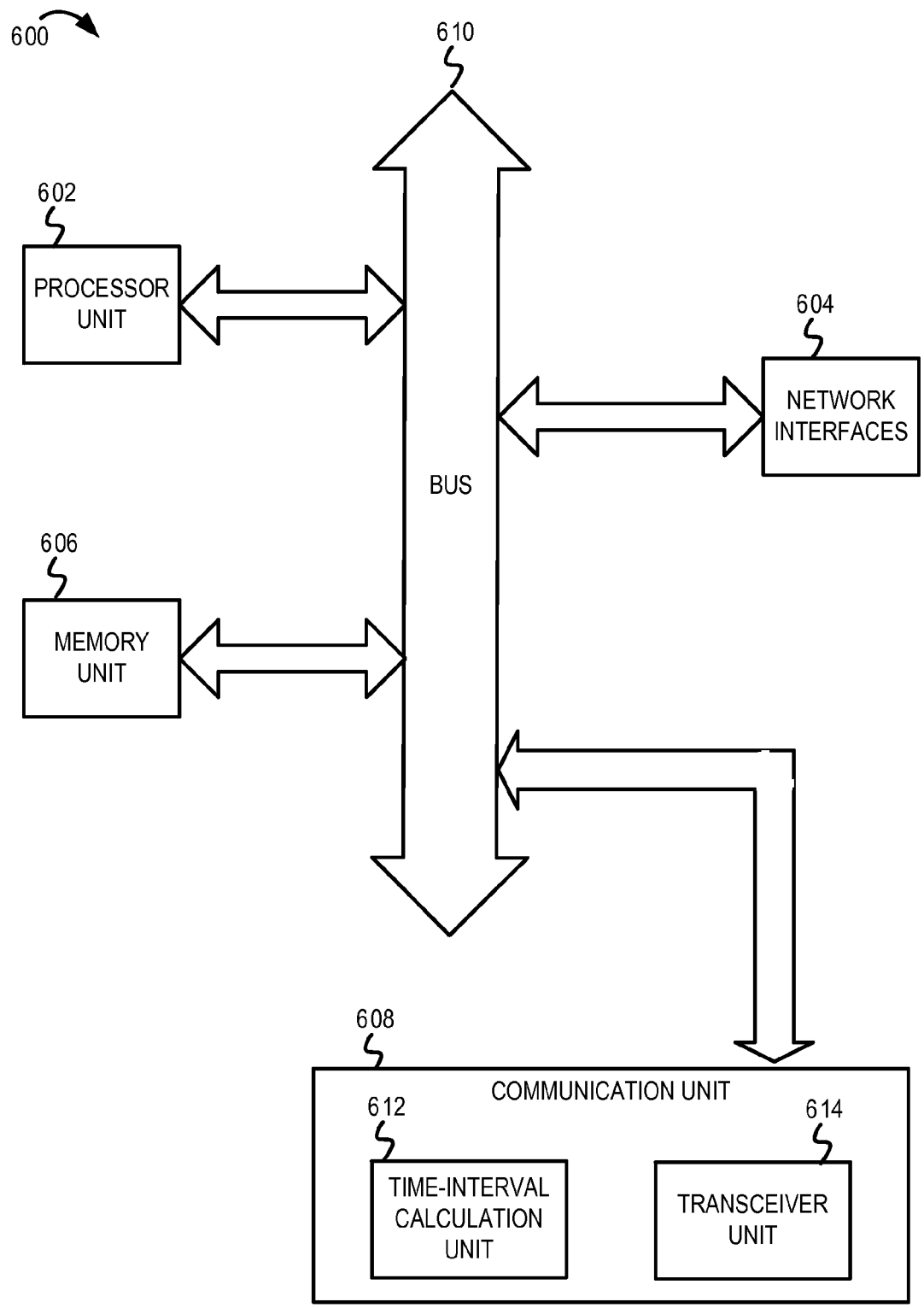
FIG. 6 is a block diagram of one embodiment of an electronic device including a mechanism for flexible transmission and back-off intervals.

FIG. 6 is a block diagram of one embodiment of an electronic device 600 including a mechanism for flexible transmission and back-off intervals. In some embodiments, the electronic device 600 can be a laptop computer, a tablet computer, a netbook, a mobile phone, a smart appliance, a wearable device, a gaming console, a desktop computer, a network bridge device, or other suitable electronic device including communication capabilities. For example, the electronic device 600 can be a WLAN device that implements WLAN communication protocols for communicating over a WLAN communication medium. The electronic device 600 includes a processor unit 602 (possibly including multiple processors, multiple cores, multiple nodes, and/or implementing multi-threading, etc.). The electronic device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer-readable storage media. The electronic device 600 also includes a bus 610 (e.g., PCI, ISA, PCI-Express, HyperTransport®, InfiniBand®, NuBus, AHB, AXI, etc.) and network interfaces 604. The processor unit 602, the memory unit 606, and the network interfaces 604 are coupled to the bus 610. The network interfaces 604 include a wireless network interface (e.g., a WLAN interface, a Bluetooth interface, a WiMAX interface, a ZigBee® interface, a Wireless USB interface, etc.) and/or a wired network interface (e.g., a powerline communication interface, an Ethernet interface, etc.). Furthermore, in some embodiments, the electronic device 600 can execute an IEEE Std. 1905.1 protocol for implementing hybrid communication functionality.

The electronic device 600 also includes a communication unit 608. The communication unit 608 includes a time-interval calculation unit 612 and a transceiver unit 614. As discussed above with reference to FIGS. 1-5, the time-interval calculation unit 612 can execute functionality to determine a back-off duration for the electronic device 600 based, at least in part, on a transmit duration for which the electronic device 600 had control of the communication medium. Any one of these functionalities may be partially (or entirely) implemented in hardware and/or on the processor unit 602. For example, the functionality may be implemented with an application specific integrated circuit (ASIC), in logic implemented in the processor unit 602, in a co-processor on a peripheral device or card, etc. In some embodiments, the communication unit 608 can be implemented on a system-on-a-chip (SoC), an ASIC, or another suitable integrated circuit to enable communications of the electronic device 600. In some embodiments, the communication unit 608 may include additional processors and memory, and may be implemented in one or more integrated circuits on one or more circuit boards of the electronic device 600. Further, realizations may include fewer or additional components not illustrated in FIG. 6 (e.g., video cards, audio cards, additional network interfaces, peripheral devices, etc.). For example, in addition to the processor unit 602 coupled with the bus 610, the communication unit 608 may include at least one additional processor unit. As another example, although illustrated as being coupled to the bus 610, the memory unit 606 may be coupled to the processor unit 602.

While the embodiments are described with reference to various implementations and exploitations, it will be understood that these embodiments are illustrative and that the scope of the inventive subject matter is not limited to them. In general, techniques for flexible transmission and back-off intervals in a network device as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of communication by a network device, comprising:
 determining, at the network device, a total back-off duration for the network device based, at least in part, on a total transmit duration for transmitting data from the network device on a communication medium and a predetermined transmit interval; and
 initiating the total back-off duration to prevent the network device from transmitting on the communication medium during the total back-off duration.

2. The method of claim 1, further comprising:
 determining the total transmit duration at the network device,
 wherein said determining the total back-off duration is in response to determining that the total transmit duration exceeds the predetermined transmit interval.

3. The method of claim 1, further comprising:
 determining the predetermined transmit interval based, at least in part, on a priority level associated with data transmitted by the network device.

4. The method of claim 1, wherein the total transmit duration is a multiple of the predetermined transmit interval.

5. The method of claim 1, wherein the total back-off duration is a multiple of a predetermined back-off interval associated with data transmitted by the network device.

6. The method of claim 1, further comprising:
 selecting a back-off interval based, at least in part, on a back-off contention window associated with the network device, wherein the back-off contention window represents a maximum number of communication time slots for which the network device defers data transmission on the communication medium.

7. The method of claim 1, wherein said determining the total back-off duration for the network device comprises:
 determining a number of back-off intervals to implement at the network device based, at least in part, on a ratio of the total transmit duration and the predetermined transmit interval; and
 determining the total back-off duration based, at least in part, on the number of back-off intervals.

8. The method of claim 1, wherein said initiating the total back-off duration at the network device comprises:
 determining whether a first back-off interval that was initiated at the network device has elapsed;
 if determined that the first back-off interval has elapsed, determining whether the total back-off duration includes the first back-off interval followed by a second back-off interval; and
 if determined that the total back-off duration includes the first back-off interval followed by the second back-off interval,
  determining whether a transmission initiated by another network device is detected on the communication medium.

9. The method of claim 8, further comprising:
 determining whether to vary a duration of the second back-off interval based, at least in part, on whether the transmission initiated by another network device is detected on the communication medium.

10. The method of claim 9, further comprising:
 increasing a length of a back-off contention window used for determining the second back-off interval with respect to a back-off contention window used for determining the first back-off interval if the transmission is detected on the communication medium; and
 determining to set the length of the back-off contention window used for determining the second back-off interval to a predetermined length if no transmissions are detected on the communication medium.

11. The method of claim 1, wherein said determining the total back-off duration for the network device comprises:
 determining a new back-off contention window associated with the network device based on at least one member selected from the group consisting of a current back-off contention window, the total transmit duration, and the predetermined transmit interval, wherein the new back-off contention window represents a maximum number of communication time slots for which the network device defers data transmission on the communication medium; and
 determining the total back-off duration based, at least in part, on the new back-off contention window.

12. The method of claim 1, further comprising:
 determining that the total back-off duration has elapsed at the network device; and
 transmitting at least one message to gain control of the communication medium in response to determining that the total back-off duration has elapsed.

13. The method of claim 1, wherein said determining the total back-off duration for the network device comprises:
 determining a number of consecutive back-off intervals to implement at the network device based, at least in part, on the total transmit duration and the predetermined transmit interval.

14. A network device comprising:
 a processor unit; and
 a time-interval calculation unit coupled with the processor unit, the time-interval calculation unit configured to:
  determine a total back-off duration for the network device based, at least in part, on a total transmit duration for transmitting data from the network device on a communication medium and a predetermined transmit interval; and
  initiate the total back-off duration to prevent the network device from transmitting on the communication medium during the total back-off duration.

15. The network device of claim 14, wherein the time-interval calculation unit is further configured to:
 determine the total transmit duration,
 wherein the time-interval calculation unit configured to determine the total back-off duration is in response to determining that the total transmit duration exceeds the predetermined transmit interval.

16. The network device of claim 14, wherein the time-interval calculation unit is further configured to:
 select a back-off interval based, at least in part, on a back-off contention window associated with the network device, wherein the back-off contention window represents a maximum number of communication time slots for which the network device defers data transmission on the communication medium.

17. The network device of claim 14, wherein the time-interval calculation unit configured to determine the total back-off duration for the network device comprises the time-interval calculation unit configured to:
 determine a number of back-off intervals to implement at the network device based, at least in part, on a ratio of the total transmit duration and the predetermined transmit interval; and determine the total back-off duration based, at least in part, on the number of back-off intervals.

18. The network device of claim 14, wherein the time-interval calculation unit configured to initiate the total back-off duration at the network device comprises the time-interval calculation unit configured to:
   determine whether a first back-off interval that was initiated at the network device has elapsed; and
   if determined that the first back-off interval has elapsed and that a second back-off interval follows the first back-off interval,
      determine whether to vary a duration of the second back-off interval based, at least in part, on whether a transmission initiated by another network device is detected on the communication medium, wherein the total back-off duration includes the first back-off interval and the second back-off interval.

19. The network device of claim 18, wherein the time-interval calculation unit is further configured to:
   increase a length of a back-off contention window used for determining the second back-off interval with respect to a back-off contention window used for determining the first back-off interval if the transmission is detected on the communication medium; and
   determine to set the length of the back-off contention window used for determining the second back-off interval to a predetermined length if no transmissions are detected on the communication medium.

20. The network device of claim 14, wherein the time-interval calculation unit configured to determine the total back-off duration for the network device comprises the time-interval calculation unit configured to:
   determine a new back-off contention window associated with the network device based on at least one member selected from the group consisting of a current back-off contention window, the total transmit duration, and the predetermined transmit interval, wherein the new back-off contention window represent a maximum number of communication time slots for which the network device defers data transmission on the communication medium; and
   determine the total back-off duration based, at least in part, on the new back-off contention window.

21. A non-transitory machine-readable storage medium having machine executable instructions stored therein, the machine executable instructions comprising instructions to:
   determine, at a network device, a total back-off duration for the network device based, at least in part, on a total transmit duration for transmitting data from the network device on a communication medium and a predetermined transmit interval; and
   initiate the total back-off duration at the network device to prevent the network device from transmitting on the communication medium during the total back-off duration.

22. The non-transitory machine-readable storage medium of claim 21, wherein said instructions further comprise instructions to:
   determine the total transmit duration at the network device, wherein said instructions to determine the total back-off duration is in response to determining that the total transmit duration exceeds the predetermined transmit interval.

23. The non-transitory machine-readable storage medium of claim 21, wherein said instructions further comprise instructions to:
   select a back-off interval based, at least in part, on a back-off contention window associated with the network device, wherein the back-off contention window represents a maximum number of communication time slots for which the network device defers data transmission on the communication medium.

24. The non-transitory machine-readable storage medium of claim 21, wherein said instructions to determine the total back-off duration for the network device comprise instructions to:
   determine a number of back-off intervals to implement at the network device based, at least in part, on a ratio of the total transmit duration and the predetermined transmit interval; and
   determine the total back-off duration based, at least in part, on the number of back-off intervals.

25. The non-transitory machine-readable storage medium of claim 21, wherein said instructions to initiate the total back-off duration for the network device comprise instructions to:
   determine whether a first back-off interval that was initiated at the network device has elapsed; and
   if determined that the first back-off interval has elapsed and that a second back-off interval follows the first back-off interval,
      determine whether to vary a duration of the second back-off interval based, at least in part, on whether a transmission initiated by another network device is detected on the communication medium, wherein the total back-off duration includes the first back-off interval and the second back-off interval.

26. The non-transitory machine-readable storage medium of claim 21, wherein said instructions to determine the total back-off duration for the network device comprise instructions to:
   determine a new back-off contention window associated with the network device based on at least one member selected from the group consisting of a current back-off contention window, the total transmit duration, and the predetermined transmit interval, wherein the new back-off contention window represent a maximum number of communication time slots for which the network device defers data transmission on the communication medium; and
   determine the total back-off duration based, at least in part, on the new back-off contention window.

27. A network device comprising:
   means for determining a total back-off duration for the network device based, at least in part, on a total transmit duration for transmitting data from the network device on a communication medium and a predetermined transmit interval; and
   means for initiating the total back-off duration to prevent the network device from transmitting on the communication medium during the total back-off duration.

28. The network device of claim 27, further comprising:
   means for selecting a back-off interval based, at least in part, on a back-off contention window associated with the network device, wherein the back-off contention window represents a maximum number of communication time slots for which the network device defers data transmission on the communication medium.

29. The network device of claim 27, wherein said means for determining the total back-off duration for the network device comprise:
   means for determining a number of back-off intervals to implement at the network device based, at least in part, on a ratio of the total transmit duration and the predetermined transmit interval; and means for determining the total back-off duration based, at least in part, on the number of back-off intervals.

30. The network device of claim 27, wherein said means for initiating the total back-off duration for the network device comprise:

means for determining whether a first back-off interval that was initiated at the network device has elapsed;

if determined that the first back-off interval has elapsed, means for determining whether the total back-off duration includes the first back-off interval followed by a second back-off interval; and if determined that the total back-off duration includes the first back-off interval followed by the second back-off interval, means for determining whether to vary a duration of the second back-off interval based, at least in part, on whether a transmission initiated by another network device is detected on the communication medium, wherein the total back-off duration includes the first back-off interval and the second back-off interval.

\* \* \* \* \*